(12) United States Patent
Cook et al.

(10) Patent No.: US 8,945,401 B2
(45) Date of Patent: Feb. 3, 2015

(54) METHOD AND APPARATUS FOR SEPARATING SOLID IMPURITIES FROM A FLUID

(75) Inventors: Russell L. Cook, Margate, FL (US); Alejandro Mejia, Coral Springs, FL (US); Lakshminarasimha Krishnapura, Boca Raton, FL (US)

(73) Assignee: Parkson Corporation, Fort Lauderdale, FL (US)

( * ) Notice: Subject to any disclaimer, the term of this patent is extended or adjusted under 35 U.S.C. 154(b) by 296 days.

(21) Appl. No.: 13/571,286

(22) Filed: Aug. 9, 2012

(65) Prior Publication Data

US 2013/0037494 A1      Feb. 14, 2013

Related U.S. Application Data

(60) Provisional application No. 61/522,617, filed on Aug. 11, 2011.

(51) Int. Cl.
*B01D 21/02* (2006.01)
*B01D 21/00* (2006.01)

(52) U.S. Cl.
CPC ........ *B01D 21/0045* (2013.01); *B01D 21/0069* (2013.01); *B01D 21/0057* (2013.01); *B01D 21/006* (2013.01)
USPC .......................... 210/802; 210/521; 210/532.1

(58) Field of Classification Search
CPC ........... B01D 21/0045; B01D 21/0057; B01D 21/0069; B01D 21/02; B01D 2021/0078
USPC .................. 210/802, 803, 521, 522, 532.1
See application file for complete search history.

(56) References Cited

U.S. PATENT DOCUMENTS

| | | | |
|---|---|---|---|
| 1,825,550 A | | 9/1931 | Schulte |
| 2,573,615 A | | 10/1951 | Seailles |
| 3,182,799 A | | 5/1965 | Krofta |
| 3,886,064 A | * | 5/1975 | Kosonen ........................ 210/522 |
| 4,089,782 A | | 5/1978 | Huebner |
| 4,120,796 A | | 10/1978 | Huebner |
| 4,151,084 A | | 4/1979 | Probstein et al. |

(Continued)

FOREIGN PATENT DOCUMENTS

CA          1028254          3/1978

OTHER PUBLICATIONS

International Search Report & Written Opinion in PCT/US2012/050105 dated Oct. 15, 2012.

*Primary Examiner* — Christopher Upton
(74) *Attorney, Agent, or Firm* — Gilberto M. Villacorta; Jessica A. Flores; Tasha M. Thomas

(57) ABSTRACT

The disclosed method and apparatus separates solid impurities from a fluid containing solid impurities. The method and apparatus allow the introduction of influent comprising a fluid containing solid impurities into a plurality of channels and allowing at least a portion of the solid impurities initially present in the influent to settle on upward-facing surfaces of a plurality of plates forming the channels or slide down the upward-facing surfaces, while permitting fluid, which has been depleted of at least a portion of solid impurities, to flow upward toward the top edges of the plurality of plates. The influent is introduced into the plurality of channels in a manner that inhibits a disrupting or disturbing of the solid impurities, which have separated from the influent.

10 Claims, 15 Drawing Sheets

(56) References Cited

U.S. PATENT DOCUMENTS

| | | | |
|---|---|---|---|
| 4,194,976 A * | 3/1980 | Robinsky | 210/521 |
| 4,202,778 A * | 5/1980 | Middelbeek | 210/522 |
| 4,883,603 A * | 11/1989 | Roggenstein et al. | 210/802 |
| 4,889,624 A | 12/1989 | Soriente et al. | |
| 4,957,628 A * | 9/1990 | Schulz | 210/521 |
| 4,997,566 A | 3/1991 | Davis | |
| 5,049,278 A | 9/1991 | Galper | |
| 5,366,638 A * | 11/1994 | Moore | 210/802 |
| 2010/0133156 A1 | 6/2010 | Han | |
| 2012/0312741 A1* | 12/2012 | Pashaian et al. | 210/521 |

* cited by examiner

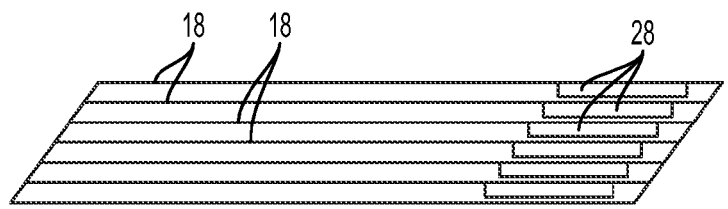
FIG. 16A
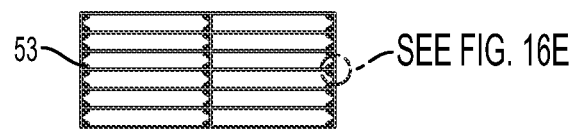
FIG. 16B
FIG. 16C
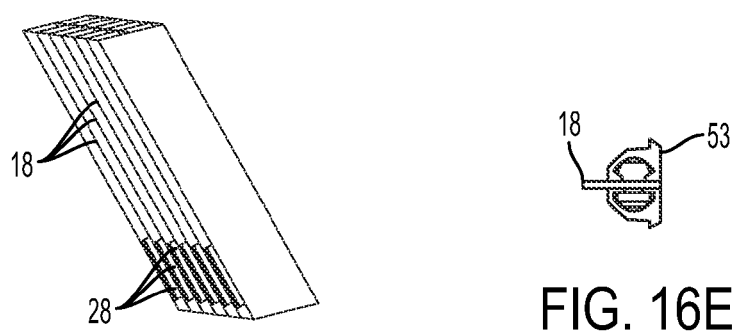
FIG. 16D
FIG. 16E

METHOD AND APPARATUS FOR SEPARATING SOLID IMPURITIES FROM A FLUID

CROSS-REFERENCE TO RELATED PATENT APPLICATIONS

This application claims the benefit of the priority date of U.S. Provisional Application No. 61/522,617, filed Aug. 11, 2011, which is incorporated herein by reference in its entirety.

The present invention relates to a method and apparatus for separating solid impurities from a fluid containing solid impurities using a gravity plate settler that inhibits a disrupting or disturbing of solid impurities, which have separated from the influent, caused by incoming influent.

BACKGROUND

Gravity plate settlers are known for use in water treatment facilities for separating solid impurities from an influent flow of fluid. Typically, a plurality of parallel plates are connected in series in a settling tank. The influent flow of fluid is distributed across the width of the plates and then flows upwardly under laminar flow conditions. The solid impurities settle on the plates while the fluid that has been depleted of the solid impurities exits from the plates as effluent at the top.

One example of a gravity plate settler is U.S. Pat. No. 5,049,278 to Galper. This patent discloses a modular plate settler comprising inlet ports for receiving an influent flow of liquid, a settling tank for settling and collecting solids separated from the influent flow of liquid, outlet weirs for discharging an effluent flow of clarified liquid, a parallelogram shaped enclosure provided with a full bottom opening for receiving the influent flow of liquid from the settling tank, and a plurality of inclined parallel gravity settling plates within the enclosure. The influent flow of liquid passes over the settling plates toward a full top opening such that the solids settle on the plates and slide downwardly under gravitational force into the tank. As a result, the flow of liquid is clarified of solids and flows through the top opening and effluent trough toward the outlet weirs.

It is desired to provide a new and improved method and apparatus for separating solid impurities from a fluid containing solid impurities using a gravity plate settler in which the influent is prevented from mixing with or stirring up the solid impurities already separated from the influent stream. This prevention of mixing or stirring may have the effect of improving the overall efficiency of the gravity plate settler.

SUMMARY

According to one embodiment of the present invention, a method of separating solid impurities from a fluid containing solid impurities, comprises: introducing influent comprising a fluid containing solid impurities into a plurality of channels, which are formed by a plurality of plates, each plate having a bottom edge, a top edge and at least one side edge connecting the bottom and top edges, the plurality of plates being stacked substantially parallel to one another and at an incline defined by an acute angle measured from a vertical edge joined to a side edge of a plate comprising said plurality of plates, and allowing at least a portion of the solid impurities initially present in the influent to settle on upward-facing surfaces of said plurality of plates or slide down said upward-facing surfaces while permitting fluid, which has been depleted of at least a portion of solid impurities that have separated from the influent, to flow upward toward the top edges of said plurality of plates where the depleted fluid can be discharged as effluent. Influent is introduced into the plurality of channels in a manner that inhibits a disrupting or disturbing of the solid impurities that have separated from the influent.

According to another embodiment of the present invention, an apparatus for separating solid impurities from a fluid containing solid impurities, comprises: a receptacle; an inlet section for flow of influent comprising a fluid containing solid impurities into the receptacle; a plurality of plates disposed within the receptacle, each plate having a bottom edge, a top edge and at least one side edge connecting the bottom and top edges, the plurality of plates being stacked substantially parallel to one another and at an incline defined by an acute angle measured from a vertical edge joined to a side edge of a plate comprising said plurality of plates; a plurality of channels formed between adjacent plates of said plurality of plates, the plurality of channels being configured to permit fluid to flow upwards and to permit solid impurities to settle on said plurality of plates or to slide downward along said plurality of plates; and an outlet section at the top edges of said plurality of plates, which is configured to discharge effluent out of the receptacle. Openings leading to the plurality of channels are configured to introduce influent above the solid impurities, which have separated from the fluid by settling on or sliding down said plurality of plates.

It is to be understood that both the foregoing general description and the following detailed descriptions are exemplary and explanatory only, and are not restrictive of the invention as claimed.

BRIEF DESCRIPTION OF THE DRAWINGS

The features, aspects, and advantages of the present invention will become apparent from the description, appended claims, and the accompanying exemplary embodiments shown in the drawings, which are briefly described below.

FIG. 16A shows a side view of a stack of plates according to one embodiment of the present invention.

FIG. 16B shows the side view of the plate stack of FIG. 16A.

FIG. 16C shows the top view of the plate stack of FIG. 16A.

FIG. 16D shows the isometric view of the plate stack of FIG. 16A

FIG. 16E shows a detailed view of one of the brackets of FIG. 16B.

DETAILED DESCRIPTION

Various embodiments of the present invention will be explained with reference to the accompanying drawings.

Figure 1:
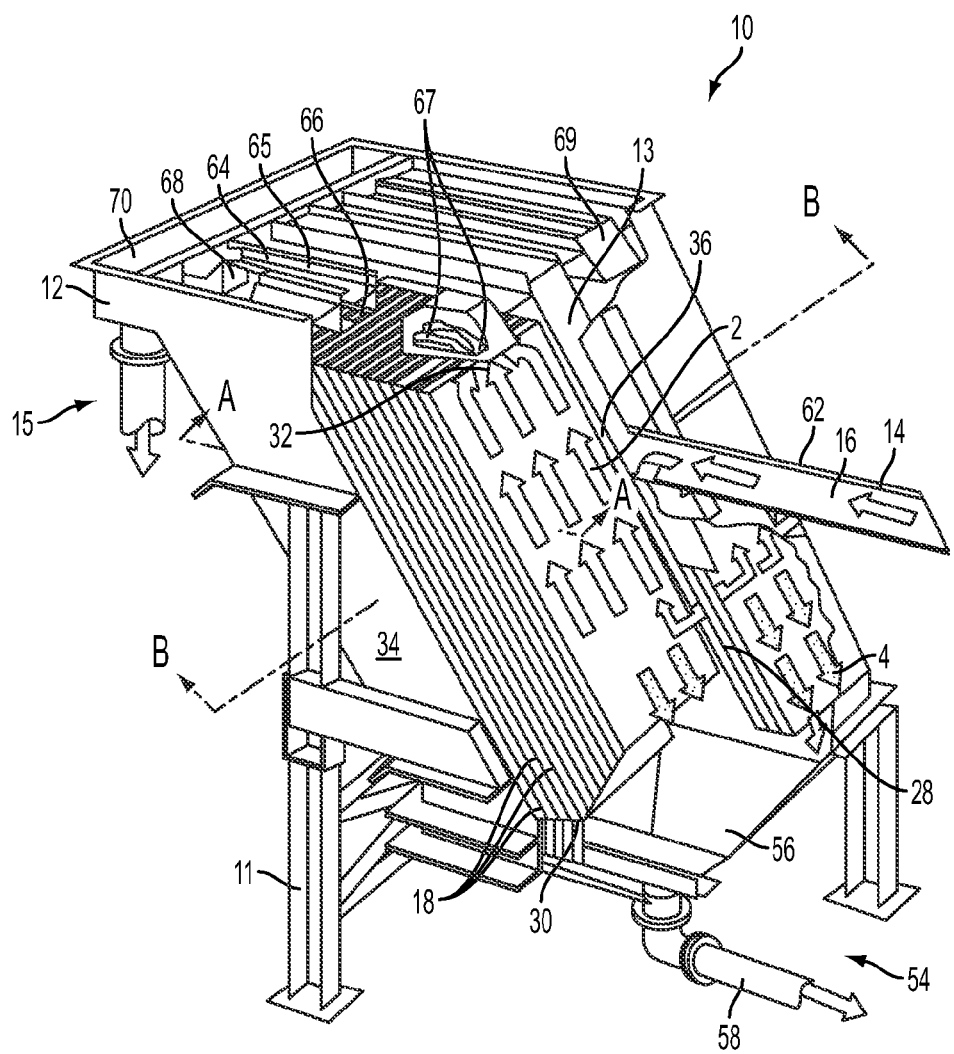
FIG. 1 shows an apparatus for separating solid impurities from a fluid containing solid impurities according to one embodiment of the present invention.
Figure 2:
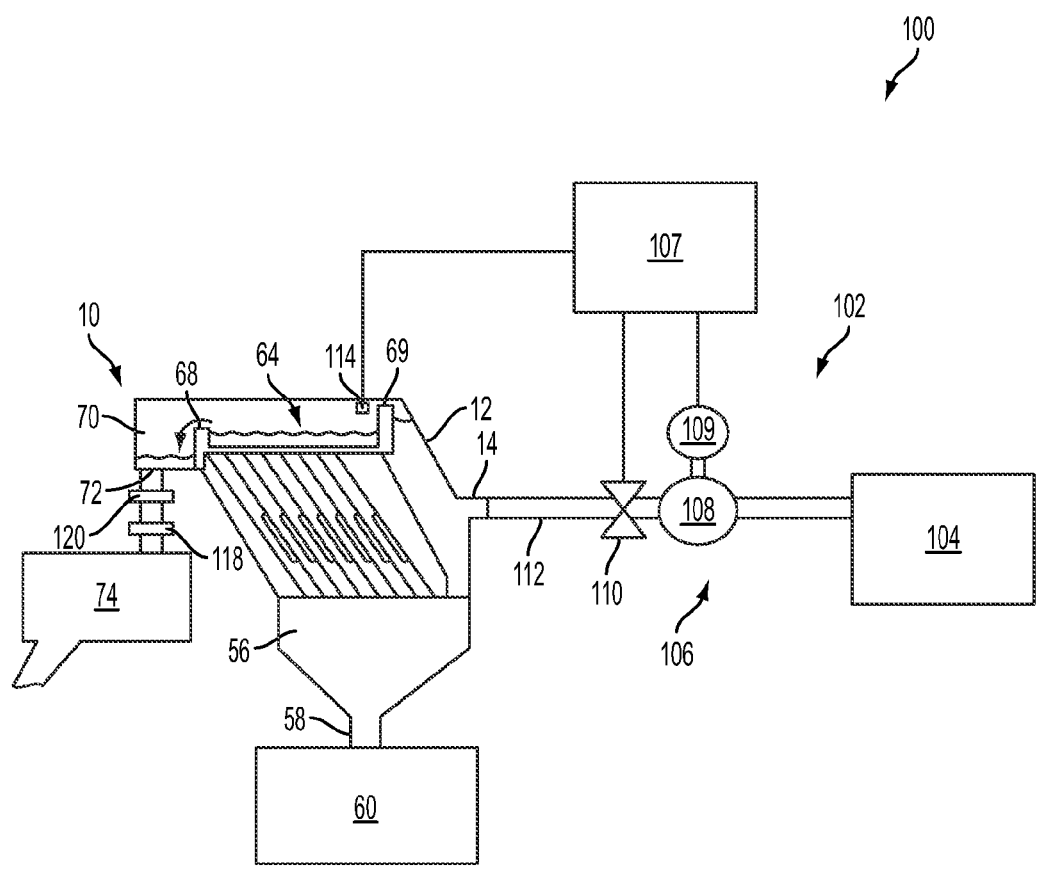
FIG. 2 is a schematic drawing showing a system for fluid treatment using the apparatus of FIG. 1.

FIG. 1 shows an apparatus 10 for separating solid impurities from a fluid containing solid impurities and FIG. 2 is a schematic drawing showing a fluid treatment system 100 that uses the apparatus 10. Generally, the apparatus 10 may comprise a receptacle 12; an inlet section 14 for the flow of influent 16 comprising a fluid containing solid impurities into the receptacle 12; a plurality of plates 18 disposed within the receptacle 12, and an outlet section 15 configured to discharge effluent out of the receptacle. The plurality of plates 18 are used to form a plurality of channels 26 in which fluid containing solid impurities are fed into the channels via openings 28 in the channels 26. The mixture of fluid and solid impurities undergo a separation as the fluid (having a lower specific gravity) flows upwards along the plates (the flow being driven by the pressure caused by the water level in the receptacle) while at least a portion of the solid impurities (having a higher specific gravity) settles on the plates 18 due to gravitational forces and/or slides down the plates 18 due to their weight by the force of gravity. The solid impurity may be any undesired material, such as sand, dirt, waste products, or other solid or semi-solid contaminants. The fluid may be any suitable fluid, such as water, wastewater, or a hydrocarbon that has a specific gravity lower than the solid impurity. The specifics of the system 100 and apparatus 10 will now be explained.

The receptacle 12 may be any suitable containing structure for containing the fluid containing the solid impurities and for housing the components disposed within the receptacle 12. For example, the receptacle 12 may be a concrete basin, a metal tank, a vessel, or other structure used to contain liquid. The receptacle 12 may be free standing or may use a support structure 11 to keep the receptacle 12 in a suitable position so as to retain the fluid containing the solid impurities therein. The receptacle may be of any suitable material such as concrete, steel, stainless steel, or any other suitable material. The receptacle 12 is in fluid communication with the inlet section 14 and the outlet section 15.

As seen in FIG. 2, the inlet section 14 may be connected in fluid communication to a fluid delivery system 102. The fluid delivery system 102 may comprise a fluid source 104 (such as a reservoir) which contains the fluid containing the solid impurities. A pumping system 106 can be used to propel the fluid from the fluid source 104 to the inlet section 14. The pumping system 106 may contain all the necessary equipment to initiate and maintain the fluid flow between the fluid source 104 and the apparatus 10, such as a pump 108 with a motor 109, a control valve 110, and/or suitable piping/tubing 112.

The pumping system 106 may also include a controller 107. The controller 107 is used to control the motor 109 (which, in turn, controls the pump 108) and/or the control valve 110 so as to obtain optimum operating conditions. The controller 107 may also monitor various operational parameters of the system 100, such as the water level in the receptacle 12 by using a water level sensor 114, the flow of fluid out of the receptacle 12 using a flow meter 118, the chemical composition of the effluent using one or more chemical sensors 120 at the exit of the device 10, any other suitable sensors, or any combination thereof. Optionally, the flow of fluid into the receptacle 12 may be monitored using a flow meter. The controller 107 may also include a display configured to display various desired operational parameters that are measured by the various sensors or calculated using the measurements from the sensors, a panel so that a user may operate the system 100, and/or an alarm to notify a user if a monitored parameter is outside a permissible operational range. The controller 107 may be constituted by a microcomputer comprising a central processing unit (CPU), a read-only memory (ROM), a random access memory (RAM), and an input/output interface (I/O interface). Alternatively or additionally, the controller may be constituted by a plurality of microcomputers. The controller 107 may comprise the necessary hardware and/or software to carry out its functions disclosed herein. For example, the software may be stored on a tangible memory device, such as a DVD or a CD-ROM, which is accessible by the controller 107.

The inlet section 14 may comprise a conduit 62 and a feed channel 13. The conduit 62 may be tubing, piping, hosing, ducting or any other suitable device with associated fittings used for connecting the fluid delivery system 102 to the feed channel 13.

The feed channel 13 connects the conduit 62 to the openings 28 of the plurality of channels 26 formed by the plurality of plates 18. The feed channel 13 may use tubing, piping, hosing, ducting or any other suitable device with associated fittings disposed within the receptacle 12. According to the embodiment of FIGS. 1 and 5, the feed channel 13 is a feed box that runs along side the plurality of plates 18 and is formed by the side walls 36 which have openings 28 so that the fluid in the feed box is directed into the channels 26 via these openings 28. As a result, the feed channel 13 is configured so that the plurality of channels 26 are in fluid communication with the conduit 62 for the entry of the fluid containing solid particles (as influent) into the plurality of channels 26. The embodiment of FIG. 1 has a plurality of stacks of plates. If more than one stack of plates is disposed in the receptacle, the feed channel may be configured so as to be in fluid communication with all the stacks of plates and their associated channels 26 via their respective openings 28.

Figure 3:
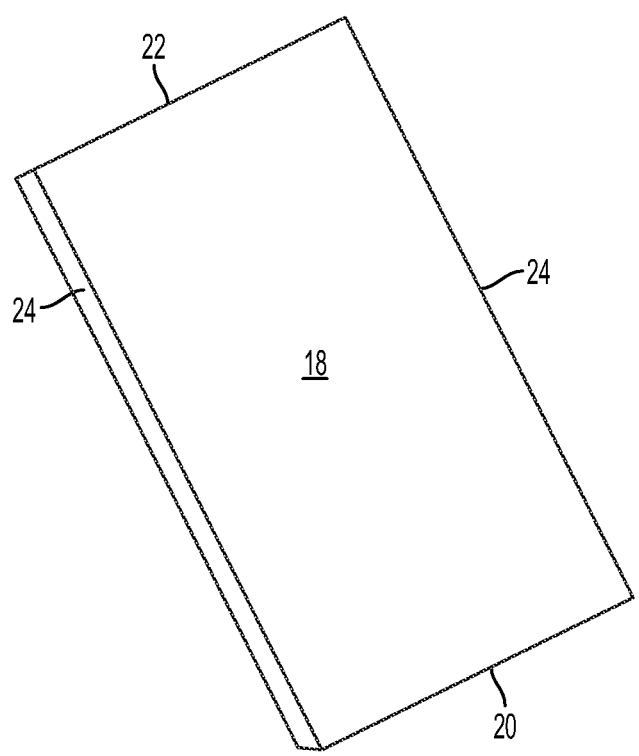
FIG. 3 shows one plate that can be used in the apparatus of FIG. 1 according to one embodiment of the present invention.
Figure 4:
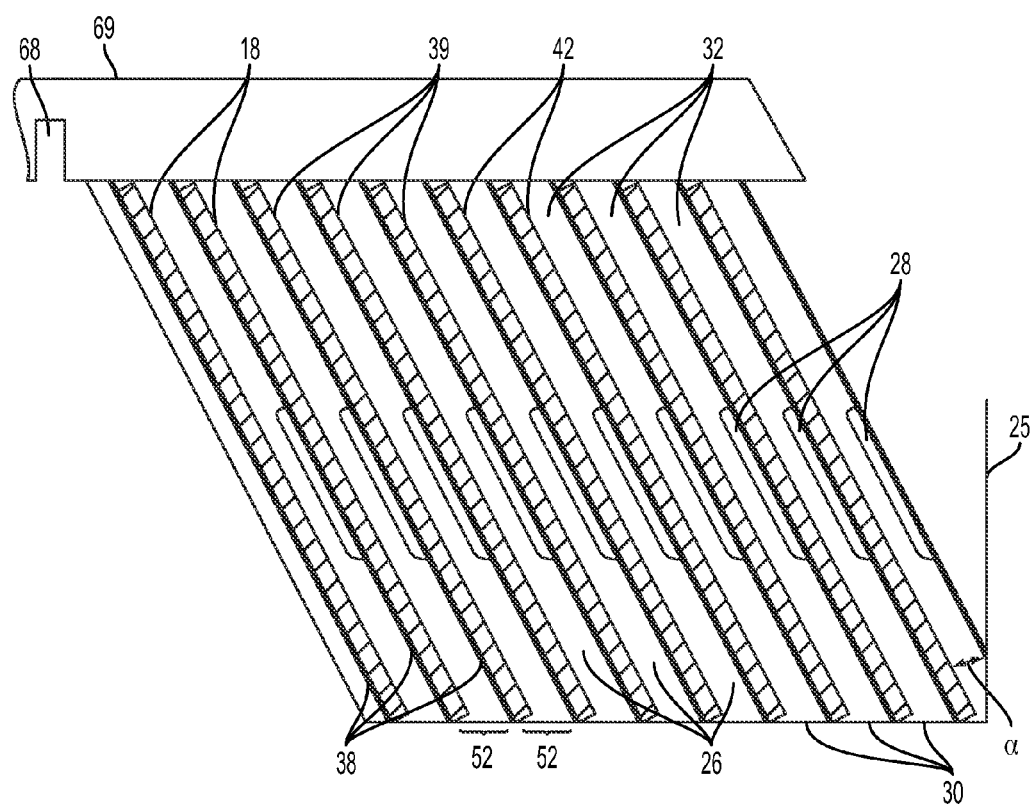
FIG. 4 shows a partial cross section of the plurality of plates along section line A-A in FIG. 1 in which the formation of the channels from the plurality of plates is shown according to one embodiment of the present invention.

The apparatus 10 of FIG. 1 shows the plurality of plates 18 within the receptacle 12 while FIG. 3 shows one plate that can be used in the apparatus of FIG. 1. FIG. 4 shows a partial cross section of the plurality of plates along section line A-A in FIG. 1 in which the formation of the channels from the plurality of plates is shown. Each plate 18 disposed in the receptacle 12 may have a bottom edge 20, a top edge 22 and at least one side edge 24 connecting the bottom and top edges. According to one embodiment of the present invention, each plate 18 may have two side edges 24 connecting the bottom and top edges, as seen in FIG. 3.

The plates may be made of any suitable material such as fiberglass, fiber-reinforced plastic (FRP), polyvinyl chloride (PVC), a stainless steel alloy, carbon steel, glass, or any other suitable material. The plates can be any suitable thickness, such as a thickness in the range of 3/16" to 1/4", preferably 9/32" to 1/8".

As seen in FIGS. 1 and 4, the plurality of plates 18 (shown in solid lines in FIG. 1 and shaded in FIG. 4) are stacked parallel or substantially parallel to one another in the receptacle 12 and at an incline defined by an acute angle a measured from a vertical edge or virtual vertical plane 25 joined to an edge of a plate comprising the plurality of plates. According to various embodiments of the present invention, the plates may be substantially parallel with a 3° or less deviation, preferably 1° or less. The acute angle a may be any suitable angle, such as, for example, an angle between 25° to 75°, preferably 25° to 65°, most preferably 55°.

In the embodiment of the present invention shown in FIG. 1, there are two sets of stacked plates 18 that run parallel with each other. It is contemplated that the number of plates and stacks of plates may change according to cost and design considerations, such as size, capacity, maintenance, etc. For example, the number of stacks of plates may be one, two, three, four, five, ten, twenty, more than twenty or any integer therebetween. Similarly, the number of plates per stack may range from two, three, four, five, ten, twenty, hundred, more than a hundred, or any integer therebetween.

As seen in FIG. 4, the plurality of channels 26 is formed between adjacent plates 18, and may have openings 28, bottom outlets 30, and top outlets 32. In FIG. 1, the plurality of channels 26 are configured to permit fluid that enter through the openings 28 to flow upwards towards the top outlets 32 (as indicated by white arrows 2), and to permit solid impurities to settle on the plurality of plates 18 or to slide downward along the plurality of plates 18 toward the bottom outlet 30 (as indicated by black arrows 4). In effect, the channels are designed to separate the solid impurities (the higher specific gravity component) from the fluid (the lower specific gravity component) such that the fluid is depleted of at least a portion of the solid impurities as it flows upward to the top outlet 32 at the top edges of the plates 18. Also, the concentration of particles increases as one moves downward along the plates.

Figure 5:
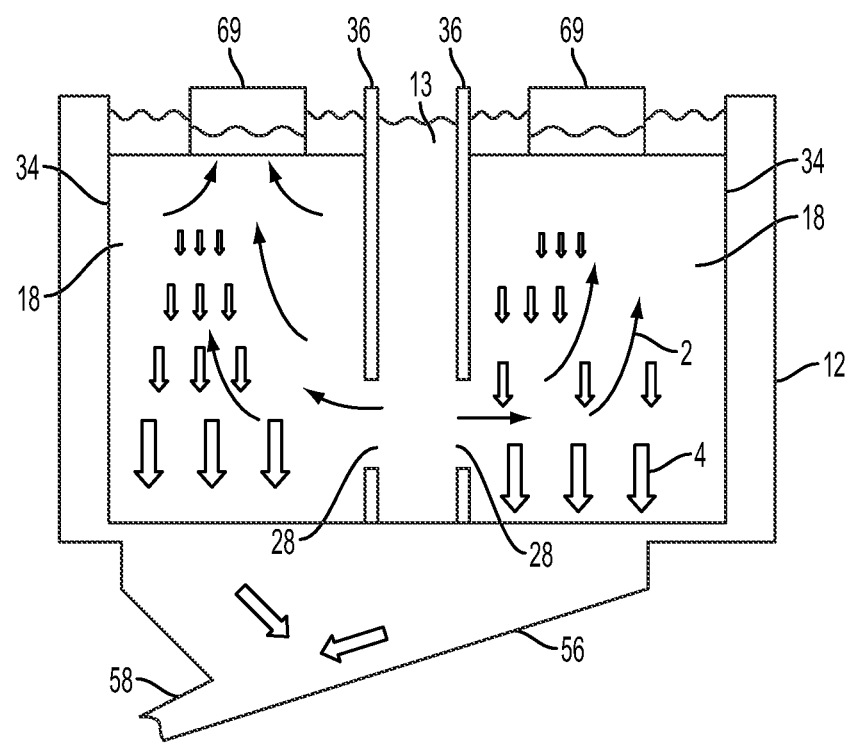
FIG. 5 shows a partial cross section of the apparatus shown in FIG. 1 along section line B-B.
Figure 6:
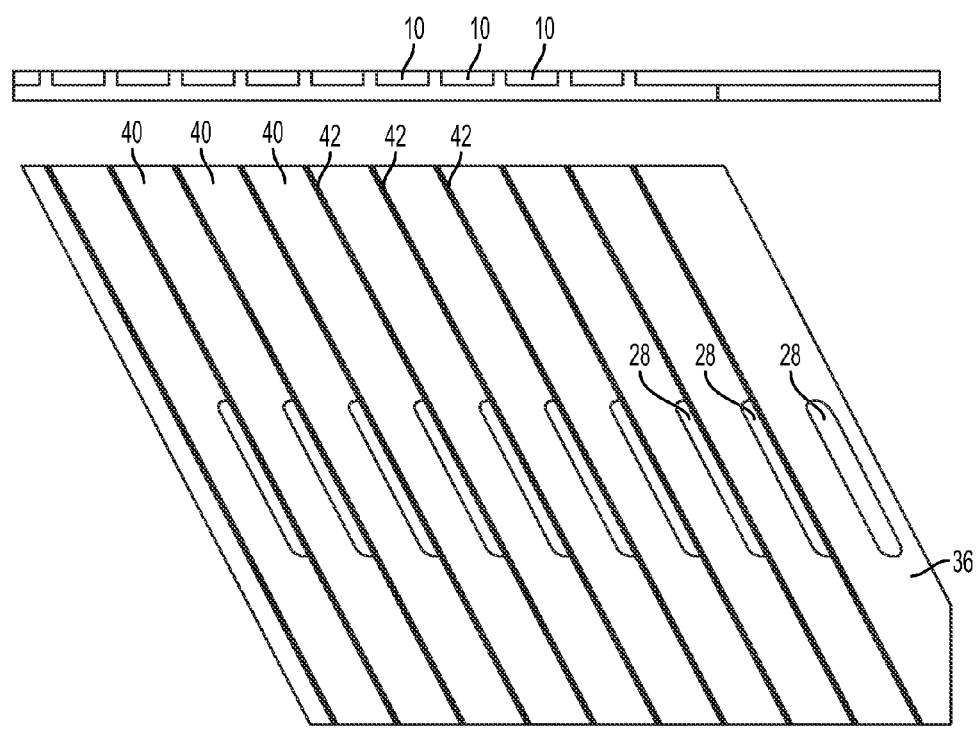
FIG. 6 shows a side wall used in the apparatus of FIG. 1 according to one embodiment of the present invention.

The channels 26 may be formed between adjacent plates 18 and between two side walls 34 and 36 on either side of the stack of plates 18. According to one example, the side wall 34 may be a side wall of the receptacle 12, as shown in FIGS. 1 and 5. Alternatively, the side wall 34 may be a separate wall from the receptacle 12. The side wall 36 may be a single planar wall or a series of planar elements with apertures forming the openings 28 (in which the planar wall or planar elements may form part of the feed channel 13 as previously discussed). The plates 18 are positioned between the side walls 34 and 36 using any suitable mechanism. For example, grooves 40 may be formed in the side wall (for example, as seen in FIG. 6) such that each plate 18 may sit upon the side wall 42 of the groove 40 (for example, as seen in FIG. 4 with the plates 18 in shaded in). Corresponding grooves may also be formed in the side wall 34.

Figure 7:
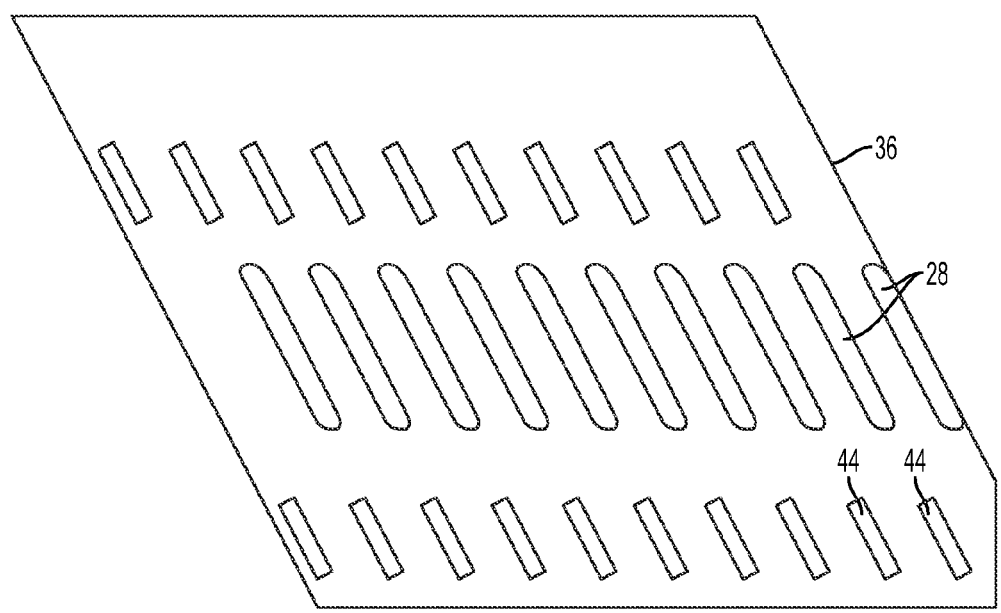
FIG. 7 shows a side wall used in the apparatus of FIG. 1 according to another embodiment of the present invention.
Figure 8:
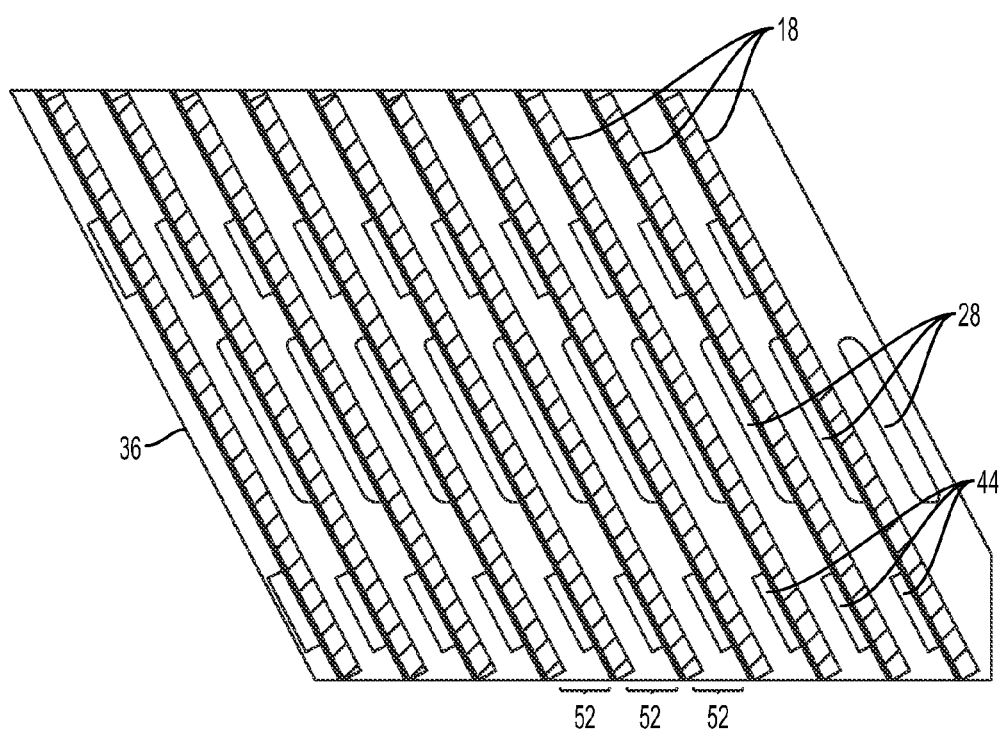
FIG. 8 shows the side wall of FIG. 7 holding a plurality of plates.

Alternatively, brackets may be attached to the side walls 34 and 36 so as to hold the plates 18 in their positions. For example, FIG. 7 shows an embodiment of the present invention in which brackets 44 are mounted on the side wall 36 and FIG. 8 shows the plates 18 (shaded in) being held by the brackets 44. Corresponding brackets are mounted on the side wall 34. Other mechanisms for maintaining the plates 18 in their slanted orientation can also be used, such as spacers between the plates or different kinds of fasteners, brackets, and support structures attached between the plates and the receptacle.

The openings 28 are arranged as apertures on the side wall 36 so that, when the stack of plates 18 are arranged in their substantially parallel arrangement, the openings 28 leading to the plurality of channels 26 are configured to introduce the fluid containing the solid impurities (as the influent) above the solid particles, which have already separated from the fluid and have settled on or are sliding down the plurality of plates 18. According to one embodiment of the present invention seen in FIG. 4, the openings 28 are positioned at or just below the downward-facing surfaces 38 of the plurality of plates 18 with the downward-facing surfaces facing in an opposite direction from the upward-facing surfaces 39. For example, the openings 28 may be positioned on an upper portion of the gaps 52, which span the distances between adjacent plates 18. In the embodiments shown in FIGS. 4 and 8, for example, the openings 28 may be placed within the top half of the space between adjacent plates 18. According to other embodiments, the openings 28 may be placed within the top third, the top quarter, or less of the space between adjacent plates. Also, the openings may have a length of up to about 30-35% of the overall length of the plates 18, for example, up to about 20%.

Figure 9:
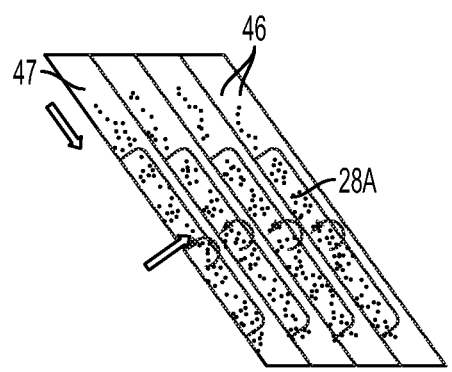
FIG. 9 shows a schematic view of the plurality of channels where the openings of the channels are located at the same level as the solid impurities.
Figure 10:
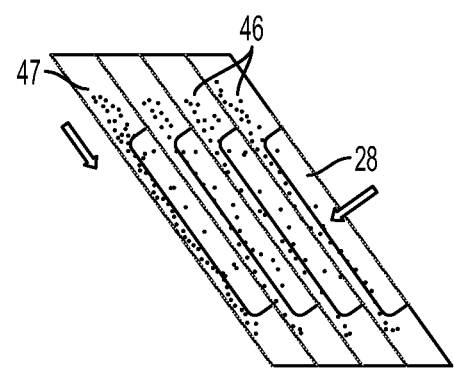
FIG. 10 shows a schematic view of the plurality of channels where the openings of the channels are located at a level above the solid impurities according to an embodiment of the present invention.

The placement of the openings 28 is advantageous because the fluid containing impurities as an influent is introduced into the plurality of channels 26 in a manner that inhibits (preferably, prevents) a disrupting or disturbing of the solid impurities, which have separated from the influent. A comparison is shown between FIGS. 9 and 10. FIG. 9 shows openings 28A that are located at the same level as the solid impurities 46, which have already separated from the fluid and either have settled on or are sliding down the plurality of plates 18. FIG. 10 shows openings 28 that are located at a level above the solid impurities 46 according to an embodiment of the present invention. FIG. 9 shows that a mixing of the influent and the solid impurities occur when the opening 28A is located at the same level as the solid impurities 46. Such a mixing reduces the effective plate utilization area of the channels for separating the fluid from the solid impurities by up to 20% or more because the sedimentation that would have taken place in the area of the plate near the opening 28 (which has a length of up to 20% of the plate length) is severely reduced or non-existent. This reduction has a profound impact on the size of the apparatus 10.

Furthermore, the mixing of the influent and solid impurities shown in FIG. 9 also causes the area 47 above the opening 28A to be less effective because particles are being pushed upward into this area. In other words, the particles that are typically disturbed in the arrangement of FIG. 9 are not only those particles around the opening 28A but also above it. By placing the openings 28 at a level above the solid impurities 46, as shown in FIG. 10, the particles in the area 47 are not as disturbed by the turbulence caused by the incoming influent, thus increasing the plate utilization area of the channels.

FIG. 10 shows that a mixing of the influent and the solid impurities is inhibited when the opening 28 is located at a level above the solid impurities 46. The reason for the lack of mixing is that the incoming influent (the fluid containing solid impurities) exerts less of a force on the solid impurities 46 that have settled on or are sliding down the plurality of plates 18. According to one embodiment of the present invention, the incoming influent may exert no significant force on the solid impurities 46. A significant force may be that no movement is caused by the incoming influent for greater than 75% of the solid impurities that have settled on or are sliding down the plurality of plates 18, preferably no movement is caused for greater than 90% of the solid impurities, most preferably no movement is caused for greater than 95% of the solid impurities.

Because the incoming influent is introduced above the solid impurities that have settled on or are sliding down the plurality of plates 18, mixing and re-entrainment of the solid impurities that have been separated from the fluid is greatly reduced. As a result, sedimentation may occur in the area of the plate near the opening 28 (which has a length of up to 20% or more of the plate length), thus, the effective plate utilization area of the channels is increased by up to 20% or more, which means that the effective plate utilization area of the channels may approach up to 100%. Such an increase in efficiency may lead to about a 25% increase in capacity relative to current designs and/or a reduction of cost of up to 25%.

Besides the openings 28 shown in FIGS. 4 and 8, the openings may take other forms according to other embodiments of the present invention. For example, although the openings 28 are shown in FIGS. 4-8 and 10 are elongated oval-shaped, the openings may have any suitable shape, such as rectangular, half-elongated oval-shaped, a plurality of circular apertures, or other similar shape. Also, placement of the opening 28 along the plate's length may be in any suitable location. For example, the midpoint of the opening may be at substantially the midpoint along the plate's length, at a third of the plate's length from the bottom edge, or at a quarter of the plate's length from the bottom edge. FIGS. 16A-16D shows an example of a stack of plates 18 that can be used in the apparatus 10 in which the opening 28 of the channels are placed near the bottom of the plate 18. FIG. 16A shows the side of the stack where the position of the openings 28 can be clearly seen. FIGS. 16B, 16C, and 16D show the side view, top view, and isometric view of the plate stack of FIG. 16A, respectively. The plates 18 are connected together through the use of brackets 53. FIG. 16E shows a detailed view of one of the brackets 53 of FIG. 16D.

Further, the size of the openings may be any desirable size such as, for example, having a opening length of 35% of the plate length, 20% of the plate length, 10% of the plate length, 5% of the plate length, or any percentage integer therebetween.

Figure 11:
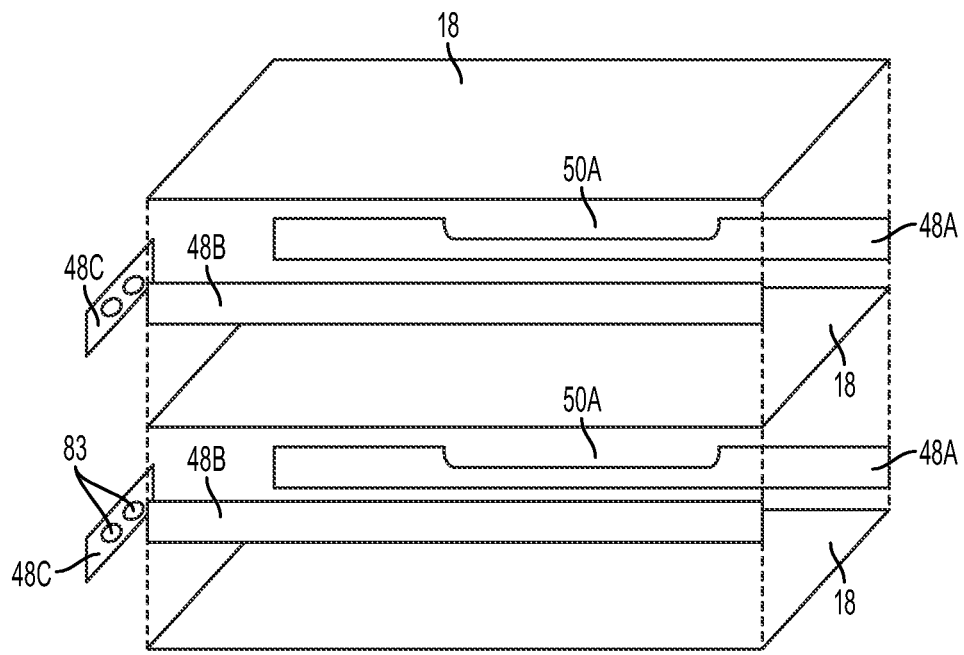
FIG. 11 shows the formation of the channels from the plurality of plates according to another embodiment of the present invention.
Figure 12:
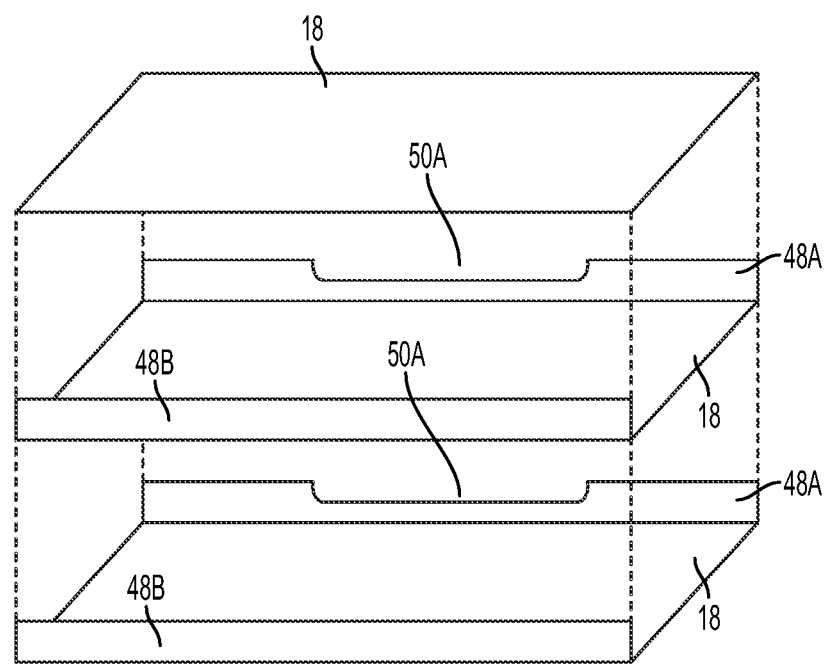
FIG. 12 shows the formation of the channels from the plurality of plates according to another embodiment of the present invention.
Figure 14:
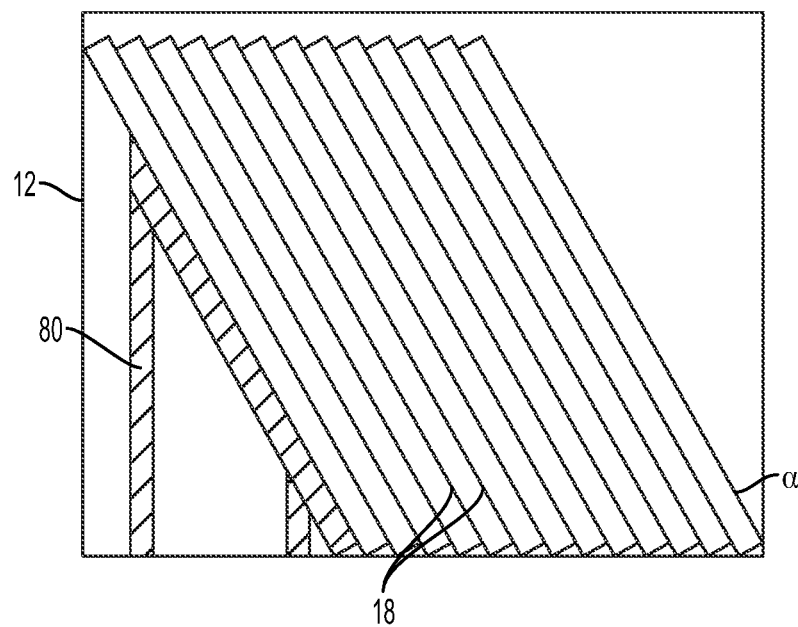
FIG. 14 shows a support structure used for supporting the plurality of plates formed by the methods shown in FIGS. 11 through 13.

The channels and openings may also be formed in other ways. For example, FIG. 11 shows the formation of the channels from the plurality of plates according to another embodiment of the present invention. Instead of one large side wall 36, a plurality of separate spacers 48 are used to help form the plurality of channels 26. The spacers 48A-48C are interspersed between and attached to the plurality of plates 18 at the side edges and top edges of the plates. The openings 28 to the channels 26 may then be provided on the separate spacers 48A located on one side of the plates in the form of cut-outs 50A which forms the openings when the plates 18 are stacked. The bottom edges of the plates are open with no spacers. According to another embodiment, the spacers 48C are removed entirely so as to be open at the top edges of the plate in a manner similar to the bottom edges of the plates, as seen in FIG. 12. In this embodiment, the feed channel 13 would be formed, in part, by the spacers 48A instead of the side wall 36. The plates 18 may also be placed on or within a support structure 80 disposed in the receptacle 12 so that the plates 18 may be stacked at an incline defined by the acute angle a, as seen in FIG. 14.

FIG. 12 shows the formation of the channels from the plurality of plates according to another embodiment of the present invention. In this embodiment, the spacers 48A and 48B that are interspersed between the plurality of plates 18 at their sides are integral with one of their adjacent plates as one-piece. There are no spacers at the top and bottom of the plates. In this embodiment as with the embodiment in FIG. 11, the spacers 48A on one side of the plates have cut-outs 50A which form the openings when the plates 18 are stacked; the feed channel 13 would be formed, in part, by the spacers 48A; and the plates 18 may also be placed on or within a support structure 80 disposed in the receptacle 12 so that the plates 18 may be stacked at an incline defined by the acute angle a, as seen in FIG. 14.

Figure 13:
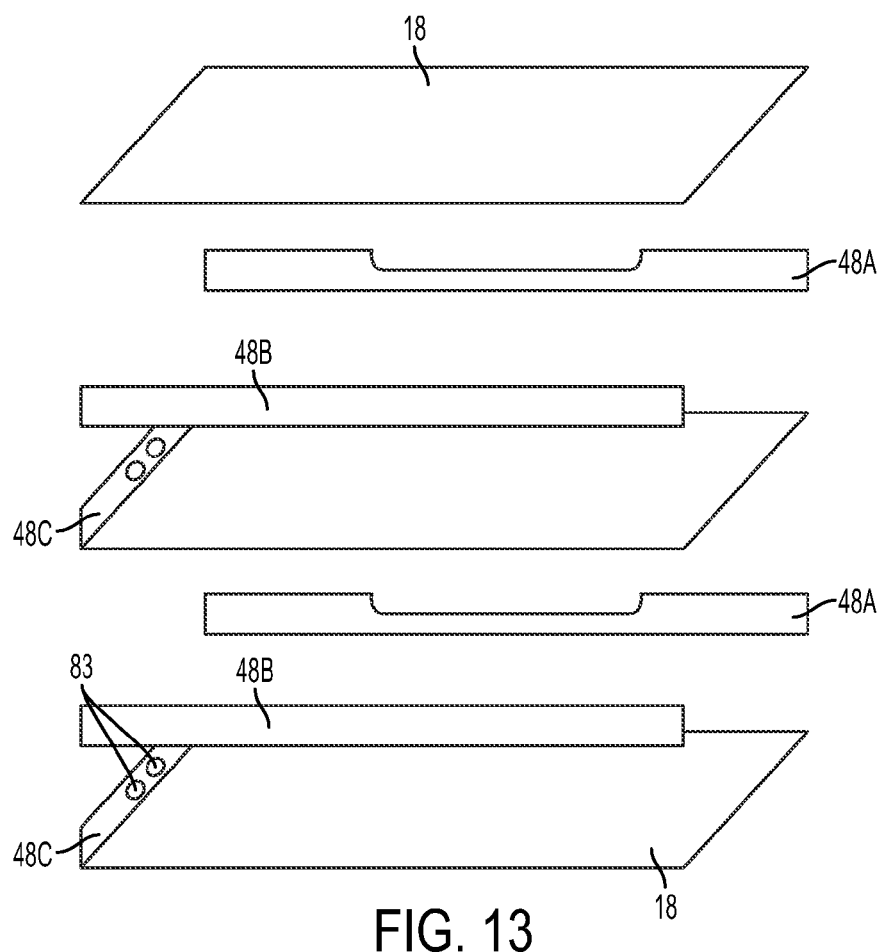
FIG. 13 shows the formation of the channels from the plurality of plates according to another embodiment of the present invention.

FIG. 13 shows the formation of the channels from the plurality of plates according to another embodiment of the present invention. In this embodiment, the spacer 48C at the top of the plates may be integral with one of their adjacent plates as one-piece. The spacers 48A and 48B that are interspersed between the plurality of plates 18 at their sides are separate pieces. In this embodiment as with the embodiment in FIG. 11, the spacers 48A on one side of the plates have cut-outs 50A which form the openings when the plates 18 are stacked; the feed channel 13 would be formed, in part, by the spacers 48A; and the plates 18 may also be placed on or within a support structure 80 disposed in the receptacle 12 so that the plates 18 may be stacked at an incline defined by the acute angle a, as seen in FIG. 14.

Besides the openings 26 for entry of the fluid containing solid impurities, the channels 26 have a bottom outlet 30 at the bottom edges 20 of the plates 18 and a top outlet 32 at the top edges 22 of the plates 18.

The bottom outlet 30 is used as an exit for the solid impurities that slide down the plurality of plates 18. In the embodiments of FIGS. 1, 4, 8, and 11-13 the bottom outlet 30 is merely a space formed between adjacent plates between their bottom edges 20. In alternate embodiments, the bottom outlet 30 may include a spacer with one or more cutouts (in a manner similar to spacers 48C at the top of the plate) in which the cutout(s) may be of any suitable size or shape.

The bottom outlet 30 is in fluid communication with an impurities collection section 54 configured to receive the separated solid impurities. The impurities collection section 54 may comprise a sludge collection zone 56 and a sludge outlet channel 58, as seen in FIG. 1. The sludge collection zone 56 may be a hopper, a funneling and collecting structure, a channeling and collecting structure, or other similar structures. The entrance of the sludge collection zone 56 may be smaller than the width of the plates 18 so that the plates 18 are supported above the sludge collection zone 56. As seen in FIG. 2, the sludge outlet channel 58 may be in fluid communication with one or more treatment apparatuses 60. For example, the sludge flow may be dewatered and/or processed by suitable hygienic measures (e.g., stabilization) in one or more treatment apparatuses 60. Other treatment processes may include one or more of the following: centrifuges, sludge drying beds, plate-and-frame filter presses, belt filter presses, or any other suitable process.

The top outlets 32 for the channels 26 lead to the outlet section 15 at the top edges of the plurality of plates 18, which is configured to discharge effluent (that is, fluid that has been depleted of at least a portion of the solid impurities) out of the receptacle 12. In the embodiments of FIGS. 1, 4, and 8, the top outlet 32 is merely a space formed between adjacent plates between their top edges 22. In the embodiments shown in FIGS. 11-13, the top outlet 32 may include one or more cutouts 83 on the top spacer 48C in which the cutout(s) may be of any suitable size or shape. According to other embodiments, the spacer 48C may be eliminated altogether from the embodiments shown in FIGS. 11-13.

The outlet section 15 may comprise an effluent collection section 64 with a distribution plate 66, an overflow weir 68, and an outlet channel 70. FIGS. 1, 4, and 5 shows that the effluent collection section 64 may be receptacle 69 placed at a location above the plurality of plates. The receptacle has side walls 65 that protrude up from the distribution plate 66. The distribution plate 66 includes apertures 67 in which the fluid that has been depleted by at least a portion of the impurities flow through the top outlet 32, through the apertures 67 and into the receptacle 69. The receptacle collects the effluent from the channels 26 until the level of the effluent reaches the height of the overflow weir 68. If more than one stack of plates is being used in the apparatus 10, there can be a receptacle 69 for each stack, a receptacle for a plurality of stacks, or one receptacle for all the stacks. The effluent then flows over the overflow weir 68 into the outlet channel 70. The outlet channel 70 collects the effluent and directs it to an exit 72. The exit 72 may optionally be in fluid communication with one or more treatment systems 74 so as to further deplete the fluid of other or similar impurities before being channeled or collected for use or released into the environment.

Other embodiments of the outlet section are also contemplated, such as the use of submerged or non-submerged orifices, weirs, v-notched weirs, and the like. For example, the effluent collection section 64 may be a receptacle 69 having no distribution plate at all, but is simply open at the bottom of the receptacle 69. In this embodiment, the fluid that has been depleted by at least a portion of the impurities flows through the top outlet 32 and into the receptacle 69 such that the effluent from the channels 26 is collected until the level of the effluent reaches the height of the overflow weir 68.

The method of separating the solid impurities from the fluid containing solid impurities using the device 10 will now be explained. The method starts by introducing influent comprising a fluid containing solid impurities from the fluid delivery system 102 into the plurality of channels 26 via the inlet section 14, the feed channel 13, and the openings 28 of the side wall 36 (or the spacers 48A, depending on the embodiment). The influent is introduced into the plurality of channels 26 in a manner that inhibits a disrupting or disturbing of solid impurities 46, which have separated from the influent. For instance, the influent may be introduced into the plurality of channels 26 sufficiently above the separated solid impurities 46, for example, by introducing the influent at or just below the downward-facing surfaces 38 of the plurality of plates 18. The influent introduced at this location may flow at a flow rate or velocity that minimizes an exertion of a disrupting or disturbing force against the separated solid impurities 46.

Next, at least a portion of the solid impurities initially present in the influent is allowed to settle on the upward-facing surfaces 39 of the plurality of plates 18 or slide down the upward-facing surfaces 39. The solid impurities 46 settle on the plurality of plates 18 by gravity or slide down the plurality of plates 18 by the force of gravity. The separated solid impurities 46 that slide down the plurality of plates may be collected into the sludge collection zone 56 of the impurities collection section 54, and directed through the sludge outlet channel 58. The separated solid impurities may optionally be further treated in one or more treatment apparatuses 60 by dewatering and/or by suitable hygienic measures (e.g., sterilization).

While the portion of the solid impurities settles on or slides down the upward-facing surfaces 39 of the plates 18, the fluid, which has been depleted of the portion of solid impurities 46, which have separated from the influent, is permitted to flow upward toward the top edges 22 of the plurality of plates 18 where the depleted fluid can be discharged as effluent into the receptacle 69 of the effluent collection section 64 via the apertures 67 in the distribution plate 66. The receptacle 69 collects the effluent from the channels 26 until the level of the effluent reaches the height of the overflow weir 68. Then, the effluent flows over the overflow weir 68 into the outlet channel 70. The effluent is directed to the exit 72, where the effluent may optionally be further treated with one or more treatment systems 74 before being channeled or collected for use or release into the environment.

Figure 15:
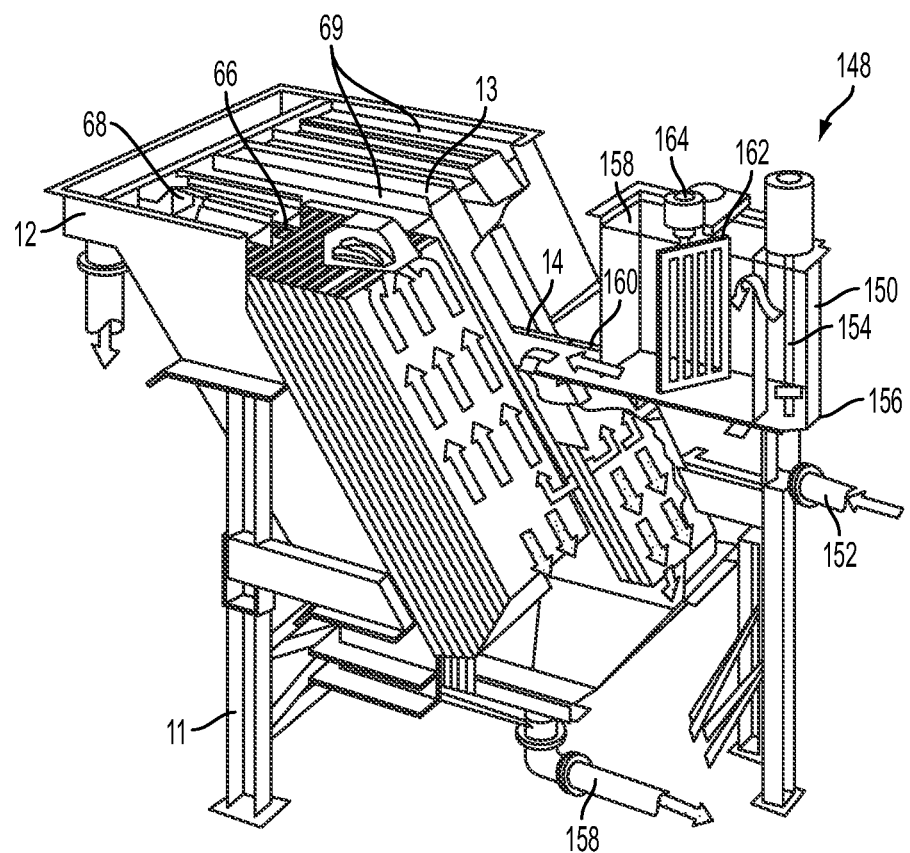
FIG. 15 shows an apparatus for separating solid impurities from a fluid containing solid impurities according to another embodiment of the present invention.

Other embodiments of the present invention are also contemplated. FIG. 15 shows a device according to another embodiment of the present invention. The embodiment of FIG. 15 is substantially similar to the embodiment of FIG. 1 except that a treatment apparatus 148 is connected to the inlet section 14. The treatment apparatus 148 may comprise a housing 150 containing an inlet 152 for the fluid containing solid impurities, a flash mix tank 154, a secondary inlet 156, a flocculation tank 158, and an outlet 160 in fluid communication with the inlet section 14 of the apparatus 10. In the treatment apparatus, the fluid with solid impurities is introduced into the housing 150 via the inlet 152. The inlet 152 may be in fluid communication with a fluid delivery system 102, like that shown in FIG. 2.

Coagulants or flocculating agents are introduced into the housing 152 via the secondary inlet 156. The fluid containing solid impurities and the coagulants or flocculating agents are mixed in the flash mix tank 154. The coagulants or flocculating agents, (for example, such as aluminum or iron salts) may react with the solid impurities in the flash mix and flocculation tank 158 so that large particles of solid impurities may form. These larger particles of solid impurities will facilitate the settling of the solid impurities onto the upward-facing surfaces of the plurality of plates or the sliding down of the solid impurities on the upward-facing surfaces of the plates.

To properly mix the coagulants or flocculating agents with the fluid containing solid impurities, there may be a serpentine path from the flash mix tank 154 to the flocculation tank 158, and the flocculation tank 150 may include one or more mixing devices 162. Suitable mixing devices may include one or more perforated panels that reciprocate in the flocculation tank 150, rotatable paddles, impeller-type mixers and/or other types of mixers. The rotation of the mixing devices 162 in the flocculation tank 150 may be caused by one or more motors 164 mounted on the housing 150 and controlled by the controller 107. After mixing and then being treated in the flocculation tank, the fluid containing solid particles then exits through the outlet 160 of the housing 150 and into the inlet section 14 of the apparatus 10.

According to other embodiments of the present invention, other treatment devices may be used before or after the apparatus 10 in the system 100, in addition to or as an alternative to the treatment apparatus 148.

Besides those embodiments depicted in the figures and described in the above description, other embodiments of the present invention are also contemplated. For example, any single feature of one embodiment of the present invention may be used in any other embodiment of the present invention. For example, the apparatus and method for treating a liquid containing impurities, may comprises any two or more of the following features in any combination:

a. introducing influent comprising a fluid containing solid impurities into a plurality of channels, which are formed by a plurality of plates, each plate having a bottom edge, a top edge and at least one side edge connecting the bottom and top edges, b. the plurality of plates being stacked substantially parallel to one another and at an incline defined by an acute angle measured from a vertical edge joined to a side edge of a plate comprising the plurality of plates, c. allowing at least a portion of the solid impurities initially present in the influent to settle on upward-facing surfaces of the plurality of plates or slide down the upward-facing surfaces while permitting fluid, which has been depleted of at least a portion of solid impurities, which have separated from the influent, to flow upward toward the top edges of the plurality of plates where the depleted fluid can be discharged as effluent, d. the influent being introduced into the plurality of channels in a manner that inhibits a disrupting or disturbing of the solid impurities, which have separated from the influent, e. the influent being introduced into the plurality of channels sufficiently above the separated solid impurities, f. the influent being introduced at or just below downward-facing surfaces of the plurality of plates, g. the influent being introduced at a flow rate or velocity that minimizes an exertion of a disrupting or disturbing force against the separated solid impurities, h. the solid impurities settling on or sliding down the plurality of plates by force of gravity, i. collecting the separated solid impurities, j. a receptacle, k. an inlet section for flow of influent comprising a fluid containing solid impurities into the receptacle, l. a plurality of plates disposed within the receptacle, each plate having a bottom edge, a top edge and at least one side edge connecting the bottom and top edges, m. the plurality of plates being stacked substantially parallel to one another and at an incline defined by an acute angle measured from a vertical edge joined to a side edge of a plate comprising the plurality of plates, n. a plurality of channels formed between adjacent plates of the plurality of plates, o. the plurality of channels being configured to permit fluid to flow upwards and to permit solid impurities to settle on the plurality of plates or to slide downward along the plurality of plates, p. an outlet section at the top edges of the plurality of plates, which is configured to discharge effluent out of the receptacle, q. openings leading to the plurality of channels being configured to introduce influent above the solid impurities, which have separated from the fluid by settling on or sliding down the plurality of plates, r. the openings being positioned at or just below downward-facing surfaces of the plurality of plates, s. the openings being positioned on an upper portion of gaps, which span the distances between adjacent plates of the plurality of plates, t. an impurities collection section configured to received the separated solid impurities, u. the impurities collection section comprising a sludge collection zone and a sludge outlet channel, and v. the outlet section comprising an effluent collection section with a distribution plate, an overflow weir, and an outlet channel.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A method of separating solid impurities from a fluid containing solid impurities, comprising:

introducing influent comprising a fluid containing solid impurities into a plurality of channels, which are formed by a plurality of plates, each plate having a bottom edge, a top edge and at least one side edge connecting the bottom and top edges, the plurality of plates being stacked substantially parallel to one another and at an incline defined by an acute angle measured from a vertical edge joined to a side edge of a plate comprising said plurality of plates, the plurality of plates having at least one side edge adjacent to a side wall, the side wall having a bottom edge, a top edge and at least one side edge connecting the bottom and top edges, the bottom and top edges of the side wall being positioned perpendicular to the bottom and top edges of each plate, the side wall containing a plurality of apertures positioned within an upper half portion of a gap that spans a distance between adjacent plates of said plurality of plates, each aperture containing a lower edge spaced vertically above the bottom edge of each plate, and allowing at least a portion of the solid impurities initially present in the influent to settle on upward-facing surfaces of said plurality of plates or slide down said upward-facing surfaces while permitting fluid, which has been depleted of at least a portion of solid impurities that have separated from the influent, to flow upward toward the top edges of said plurality of plates where the depleted fluid can be discharged as effluent, wherein influent is introduced through said apertures so as to inhibit disruption or disturbance of the solid impurities that have settled on or are sliding down said upward-facing surfaces of said plurality of plates.

2. The method of claim 1 in which influent is introduced at or just below downward-facing surfaces of said plurality of plates.

3. The method of claim 2 in which influent is introduced at a velocity that minimizes an exertion of a disrupting or disturbing force against the separated solid impurities.

4. The method of claim 1 in which the solid impurities settle on or slide down said plurality of plates by force of gravity.

5. The method of claim 1 which further comprises collecting the separated solid impurities.

6. An apparatus for separating solid impurities from a fluid containing solid impurities, comprising:

a receptacle;

an inlet section for flow of influent comprising a fluid containing solid impurities into the receptacle;

a plurality of plates disposed within the receptacle, each plate having a bottom edge, a top edge and at least one side edge connecting the bottom and top edges, the plurality of plates being stacked substantially parallel to one another and at an incline defined by an acute angle measured from a vertical edge joined to a side edge of a plate comprising said plurality of plates;

a plurality of channels formed between adjacent plates of said plurality of plates, the plurality of channels being configured to permit fluid to flow upwards and to permit solid impurities to settle on said plurality of plates or to slide downward along said plurality of plates;

a side wall positioned adjacent to at least one side edge of the plurality of plates, the side wall having a bottom edge, a top edge, and at least one side edge connecting the bottom and top edges, the bottom and top edges of the side wall being positioned perpendicular to the bottom and top edges of each plate, the side wall containing a plurality of apertures leading to the plurality of channels; and an outlet section at the top edges of said plurality of plates, which is configured to discharge effluent out of the receptacle, wherein said apertures are configured to introduce influent above the solid impurities, which have separated from the fluid by settling on or sliding down said plurality of plates, wherein each of the apertures is positioned on an upper half portion of a gap that spans a distance between adjacent plates of said plurality of plates, and wherein each of the apertures contain a lower edge positioned vertically above the bottom edge of each plate.

7. The apparatus of claim 6 in which the apertures are positioned at or just below downward-facing surfaces of said plurality of plates.

8. The apparatus of claim 6 further comprising an impurities collection section configured to received the separated solid impurities.

9. The apparatus of claim 8 in which the impurities collection section comprises a sludge collection zone and a sludge outlet channel.

10. The apparatus of claim 6 in which the outlet section comprises an effluent collection section with a distribution plate, an overflow weir, and an outlet channel.

* * * * *